United States Patent [19]

Peitsmeier et al.

[11] Patent Number: 4,798,067
[45] Date of Patent: Jan. 17, 1989

[54] STEERING WHEEL LOCK FOR MOTOR VEHICLES

[75] Inventors: Karl Peitsmeier, Neuhausen; Gottfried Schremmer, Tamm, both of Fed. Rep. of Germany

[73] Assignee: Daimler-Benz Aktiengesellschaft, Fed. Rep. of Germany

[21] Appl. No.: 79,521

[22] Filed: Jul. 30, 1987

[30] Foreign Application Priority Data

Aug. 8, 1986 [DE] Fed. Rep. of Germany ....... 3626925

[51] Int. Cl.⁴ .............................................. B60R 25/02
[52] U.S. Cl. ......................................... 70/252; 70/186
[58] Field of Search ................. 70/252, 186, 253, 254, 70/255, 185, 184, 183, 182

[56] References Cited

U.S. PATENT DOCUMENTS

| | | | |
|---|---|---|---|
| 3,490,255 | 1/1970 | Wight | 70/252 |
| 4,442,688 | 4/1984 | Saegusa | 70/252 |
| 4,726,207 | 2/1988 | Gifford | 70/420 |

FOREIGN PATENT DOCUMENTS 3443712 6/1986 Fed. Rep. of Germany .

*Primary Examiner*—Robert L. Wolfe
*Attorney, Agent, or Firm*—Barnes & Thornburg

[57] ABSTRACT

A steering wheel lock for motor vehicles, with a steering column of adjustable inclination and with a locking cylinder housing displaceable in the dashboard in its longitudinal axis only, has an articulated connection of the locking cylinder housing to a detent pin housing and a gimbal or pivotal connection of the shafts transmitting the locking movement.

13 Claims, 3 Drawing Sheets

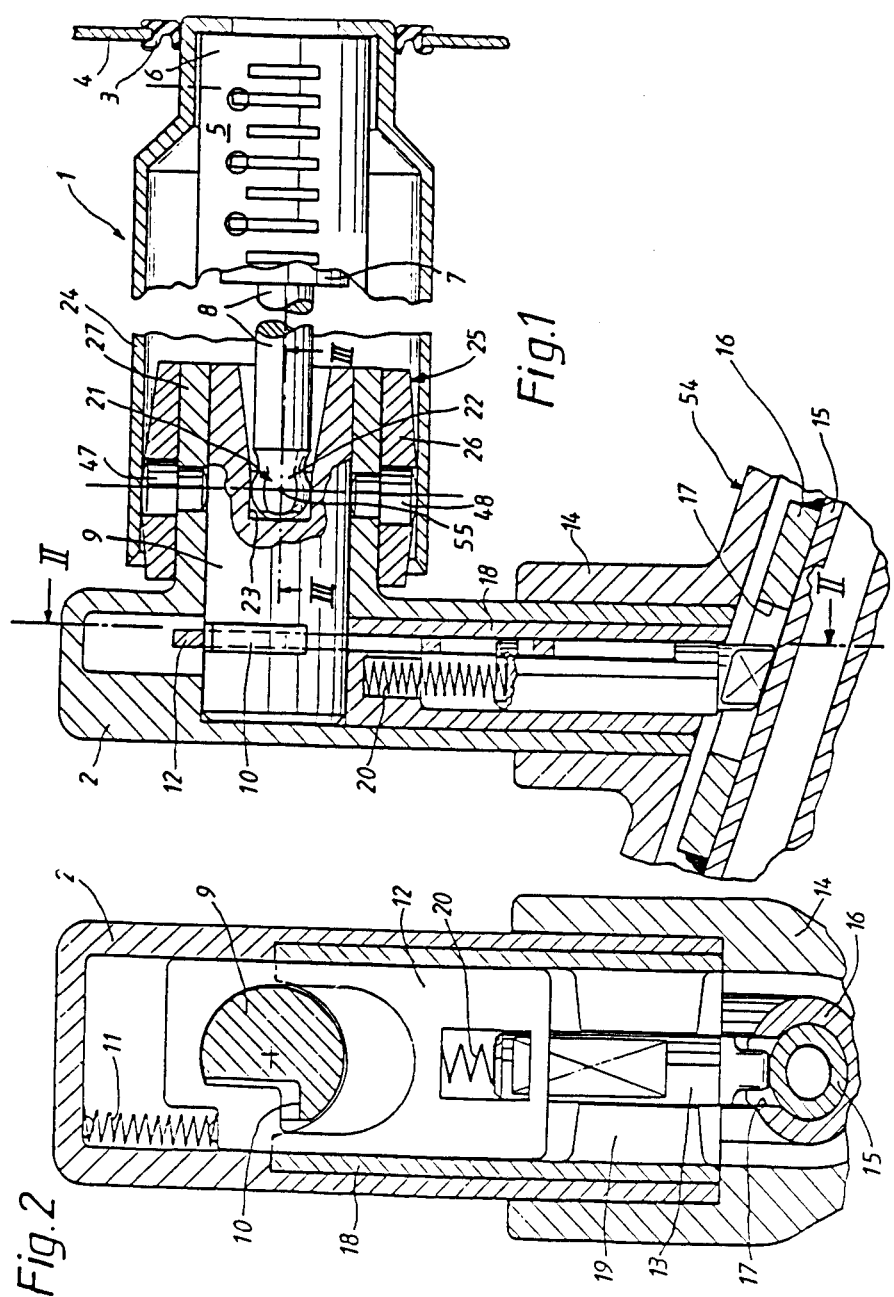

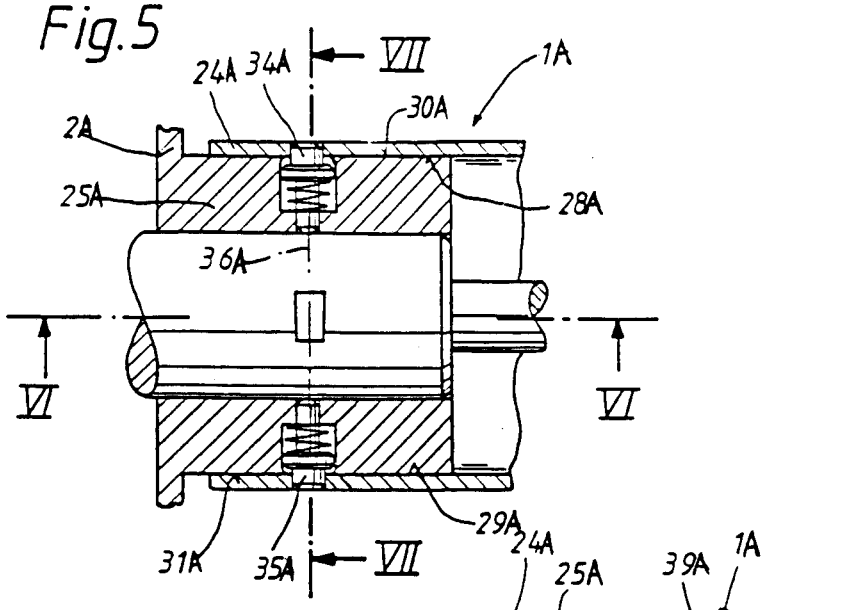
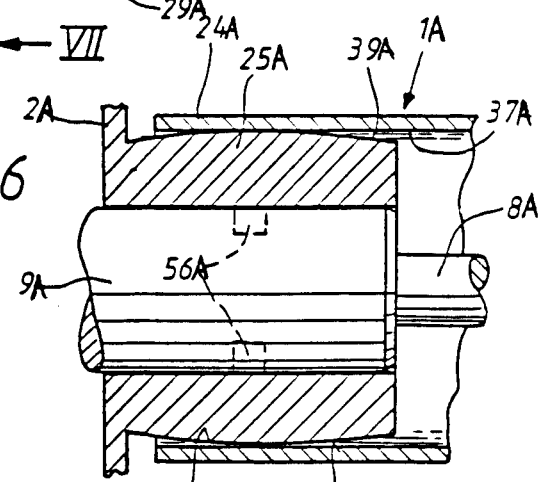
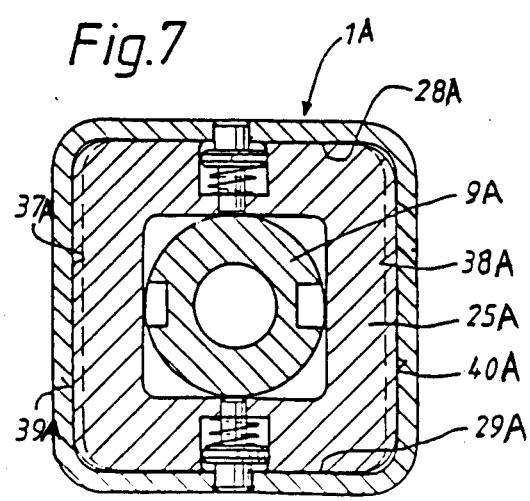

STEERING WHEEL LOCK FOR MOTOR VEHICLES

BACKGROUND AND SUMMARY OF THE INVENTION

The invention relates to a steering wheel lock for motor vehicles of the type having a steering column of adjustable inclination.

German Patent Specification No. 3,221,484 describes a steering wheel lock for a motor vehicle with a vertically adjustable steering wheel, in which a locking cylinder is moved integrally with the steering column and its key insertion orifice is shifted in a longitudinal slot in the dashboard.

Such an extended dashboard orifice is detrimental to the overall arrangement of the surrounding fittings and, because of the space which it requires, demands an additional outlay in terms of material and manufacturing steps in order to achieve an appropriate design.

The particular exposed orifice of the longitudinal slot has to be covered by a cover part, so that the driver does not push the vehicle key into the dashboard next to the key insertion orifice.

At the same time, the range of movement of the steering lock places high demands on the deformability of the cover part and/or on its guides, thus resulting in further costs.

German Published Unexamined Application (DOS) No. 3,443,712 discloses another steering wheel lock arrangement which includes a cardan coupling for accommodating tilting movement of a steering shaft.

An object of the invention is to design a steering wheel lock such that the steering column continues to be easily adjustable, despite the fact that there are no longer any possibilities for the housing surrounding the key insertion orifice to shift transversely to its axial direction in the adjacent region of the dashboard.

This object is achieved by providing a gimbal connection at respective square telescoping housing parts of a locking cylinder housing and a detent pin housing.

As a result of the articulated connection of the housings and the movement transmitting shafts, the inclination of the steering column is easily adjustable, without position of the locking cylinder in the dashboard having to be changed.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic longitudinal sectional view which shows a steering wheel lock constructed in accordance with a preferred embodiment of the invention;

FIG. 2 is a sectional view taken along line II—II in FIG. 1;

FIG. 5 is a partial schematic sectional view which show as an alternative simplified embodiment of an articulated housing connection constructed in accordance with the present invention;

FIG. 6 shows a section taken along the line VI—VI of FIG. 5; and

FIG. 7 shows a section taken along the line VII—VII of FIG. 5.

DETAILED DESCRIPTION OF THE DRAWINGS

Figure 3:
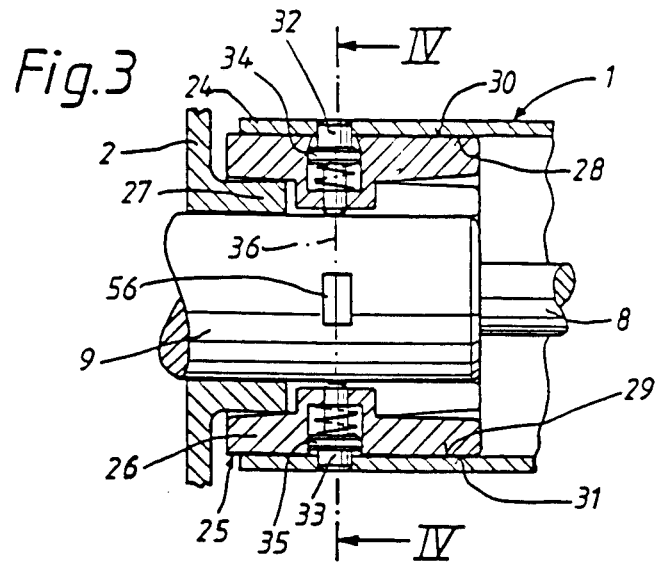
FIG. 3 shows a portion of the steering wheel lock taken along the sectional line III—III of FIG. 1.
Figure 4:
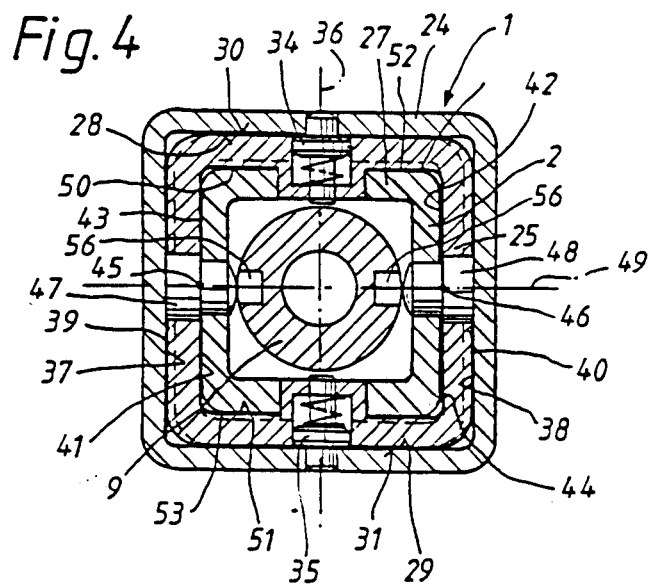
FIG. 4 shows a section taken along the line IV—IV in FIG. 3.

A steering wheel lock constructed according to a first preferred embodiment of the invention is shown in FIGS. 1–4 and comprises a locking cylinder housing 1 and a detent pin housing 2 which are connected to one another in an articulated manner.

The locking cylinder housing 1 is arranged in a vehicle dashboard 4 at one end via a gasket 3 so as to be displaceable in the axial direction only and receives a locking cylinder 5 having a stator 6 fastened in the locking cylinder housing 1. Rotor 7 of locking cylinder 5 transmits a limited rotary movement in the clockwise direction and back again to a shaft 8 connected operatively to a control shaft 9 by a vehicle key (not shown) engaging into the locking cylinder 5. By a cam 10 fitted in controls haft 9, it shifts a tappet 12 held in contact by a spring 11 and acting on a detent pin 13.

The detent pin housing 2 is connected firmly to a receptacle in an outer tube 14 receiving a steering shaft 15 and a locking ring 16 weld coaxially on the latter. These are prevented from rotating further because the advanced detent pin 13 rests in an orifice 17 in the locking ring 16. This locks the vehicle against unauthorized steering.

If the detent pin 13 does not encounter the orifice 17 immediately during its shift along guides 19 formed on a bearing sleeve 18, it is engaged therein, during the next rotation of the steering shaft 25, by means of a spring 20 supported in the bearing sleeve 18.

Articulated torque transmission between the shaft 8 and the control shaft 9 is obtained by a gimbal connection 21 which takes effect by the pivotable engagement of a spherical headpiece 22 of the shaft 8 into a recess 23 which absorbs its torque and which is located in the control shaft 9.

In the embodiment shown in FIGS. 1 to 4, in an end region pointing towards the detent pin housing 2, the locking cylinder housing 1 is designed as a square tube 24, into which engages a square housing part 25. The housing part 25 consists here, of a tubular piece 26, into which an extension of the detent pin housing 2 designed as a square flange 27 engages in turn. The square tube 24, on two parallel first side faces 28, 29, is connected to the first side faces 30, 31 of the square housing part 25, which are parallel to them, at two points, 32, 33 by two pivot pins 34, 35. The pivot pins 34, 35 in a first axis 36 which is aligned perpendicularly to the first side. faces 28, 29.

To allow a pivoting movement about the first axis 36, the second side faces 37, 38 of the square tube 24, which are aligned approximately perpendicularly to the first side faces 28, 29, are at a sufficient distance from the second side faces 39, 40 of the housing part 25.

This distance is obtained because the two side faces 39, 40 of the housing part 25 are cut off at an angle on both sides of their tilting line, which is fixed by the first axis 36.

This cut off can also be accomplished on the opposite second side faces 37, 38 of the square tube 24 according to other contemplated embodiments.

A second pivoting possibility for the housing 1, 2 is provided because the housing part 25 is connected in a corresponding way, by its second inner faces 41, 42 extending in the direction of the second side faces 39, 40, to the opposite parallel side faces 43, 44 of the square flange 27 at two points 45, 46. Pivot pins 47, 48 are arranged perpendicularly to the second inner faces 41, 42 in a second axis 49 at two points 45, 46.

First inner faces 50, 51, arranged approximately perpendicularly to the second inner faces 41, 42, are at a sufficient distance from the opposite faces 52, 53 of the square flange 27 for a pivoting movement about the second ais 49, as a result of a surface bevel which is made there and which can also be made in the faces 52, 53.

A favorable pivoting movement about two axes for adjusting the inclination of the steering column 54 is obtained because the first axis 36 and the second axis 49 are perpendicular to one another and run through a central pivoting point 55 of the gimbal connection 21.

To make the interior of the locking cylinder housing 1 and of the detent pin housing 2 accessible, the pivot pins 34, 35 engaging into the outer locking cylinder 1 are installed releasably. That is to say, in a specific position of the shaft 8 brought about by the vehicle key, the pivot pins 34, 35 can be pressed into a slot 56 located on both sides of the control shaft 9, with the result that the locking cylinder housing 1 can be removed. In the other key positions, the control shaft 9 does not allow the pivot pins 34, 35 to be pressed in.

FIGS. 5 to 7 illustrate a simplified design of the articulated connection of a locking cylinder housing 1A to a detent pin housing 2A. Here a square housing part 25A, connected to the detent pin housing 2A is connected directly to the square tube 24A via two pivot pins 34A, 35A which are arranged perpendicularly in two parallel first side faces 28A, 29A of the square tube 24A and which form a first axis 36A. The second side faces 37A, 38A of the square tube 24A, which are aligned approximately perpendicularly thereto, are at a distance from the second side face4s 39A, 40 A of the housing part 25A which allows the pivoting movement about the first axis 36A. to separate the housing 1A, 2A from one another, in a specific key position or in a position of the control shaft 9A determined thereby, the pivot pins 34A, 35A can be pressed into a slot 56A located on both sides.

As a result of this design, when the inclination of a steering column 54 is adjusted, it is possible for the locking cylinder housing 1A to pivot about a first axis 36A relative to the detent pin housing 2A, this being sufficient for small adjustment angles of the steering column 54.

Furthermore, this invention includes a design in which the locking cylinder housing articulately engages a housing part connected to the detent pin housing, and also a biaxial articulated housing connection, in which the locking cylinder housing is located in a housing part and the latter is located in a square flange of the detent pin housing.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Steering wheel lock for motor vehicles with a steering column of adjustable inclination, comprising a detent pin housing connected to an outer tube surrounding a steering column, a locking cylinder housing adjoining the detent pin housing and having a locking cylinder, a locking cylinder housing end piece surrounding a key insertion orifice arranged in a peroration of a vehicle dashboard, said locking cylinder housing having one end located in the dashboard so as to be displaceable in an axial direction only, wherein the detent pin housing is pivotably connected for movement about at least one connecting axis relative to the locking cylinder housing, by a gimbal coupling connecting the housings such that a shaft stressed by a rotor of the locking cylinder is engaged with a control shaft acting on a detent pin by a gimbal connection, wherein the control shaft is mounted rotatably in the detent pin housing and, in an angled position, is arranged firmly in the latter so as to be pivotable relative to the locking cylinder housing, wherein the locking cylinder housing forms a square tube at least in the end region pointing towards the detent pin housing, said square tube engagably surrounding a square housing part connected to the detent pin housing, wherein the square tube is connected pivotably, on two parallel first side faces at two points through which a first axis runs perpendicularly, to the first side faces to opposite respective parallel first side faces of the housing part, and wherein second side faces of the square tube, which are aligned approximately perpendicularly to these first side faces, and second side faces of the housing part are at a distance from one another which allows pivoting about the first axis.

2. Steering wheel lock according to claim 1, wherein the housing part is formed by a tubular piece which, on two inner faces extending in the direction of the second side faces is connected pivotably, at two points through which a second axis runs perpendicularly to the second inner faces, to the opposite parallel side faces of a square flange engaging into the housing part and belonging to the detent pin housing; and wherein the first inner faces of the housing part, which are approximately perpendicular to the second inner faces, are at a sufficient distance from the opposite faces of the square flange for permitting a pivoting movement about the second axis.

3. Steering wheel lock according to claim 1, wherein a pivot mounting includes pivot pins aligned respectively in the direction of the axes and inserted into the squares being connected.

4. Steering wheel lock according to claim 2, wherein a pivot mounting includes pivot pins aligned respectively in the direction of the axes and inserted into the squares being connected.

5. Steering wheel lock according to claim 3, including means for disengaging said pivot pins from the locking cylinder housing as a function of the position of slots in the control shaft.

6. Steering wheel lock according to claim 4, including means for disengaging said pivot pins from the locking cylinder housing as a function of the position of slots in the control shaft.

7. Steering wheel lock according to claim 2, wherein both the axes extend through a central pivoting point of the gimbal connection.

8. Steering wheel lock according to claim 5, wherein both the axes extend through a central pivoting point of the gimbal connection.

9. Steering wheel lock arrangement for motor vehicles of the type having a steering column of adjustable inclination, comprising
   a detent pin housing for guiding a detent pin which is movably engagable to rotatably lock a vehicle steering shaft,
   a locking cylinder housing for guiding a movable manual key actuable locking cylinder rotor which operably moves the detent pin between respective steering shaft locking and unlocking positions, and
   pivotal connection means connecting the detent pin housing and locking cylinder housing with accommodation for adjusting inclination of steering column housing and the steering shaft while maintaining a locking key aperture of the locking cylinder housing at a fixed vehicle dashboard position,
   wherein said pivotal connection means comprises respective detent pin and locking cylinder housing parts of rectangular shape in surrounding engagement with one another and pivotably connected with one another.

10. A steering wheel lock arrangement according to claim 9, wherein the respective housing parts are tubular square parts which are pivotally connected at pivot connections on opposite walls of the square parts.

11. A steering wheel lock arrangement according to claim 10, wherein the tubular square parts are pivotally connected at pivot connections on all four respective facing walls thereof such that they can be pivoted about two mutually perpendicular pivot axes which intersect at a common central point.

12. A steering wheel lock arrangement according to claim 9, wherein the locking cylinder housing part surrounds the detent pin housing part.

13. A steering wheel lock arrangement according to claim 11, wherein the locking cylinder housing part surrounds the detent pin housing part.

* * * * *